(12) United States Patent
Mahmoud

(10) Patent No.: US 7,565,521 B2
(45) Date of Patent: *Jul. 21, 2009

(54) METHOD FOR MANAGING MEMORY SPACE DURING SYSTEM INITIALIZATION

(75) Inventor: Fadi A. Mahmoud, Livermore, CA (US)

(73) Assignee: Adaptec, Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/801,650

(22) Filed: May 9, 2007

(65) Prior Publication Data

US 2007/0220243 A1 Sep. 20, 2007

Related U.S. Application Data

(63) Continuation of application No. 10/133,812, filed on Apr. 24, 2002, now Pat. No. 7,234,047.

(51) Int. Cl.
- *G06F 9/00* (2006.01)
- *G06F 9/24* (2006.01)
- *G06F 15/177* (2006.01)

(52) U.S. Cl. .......................................... 713/1
(58) Field of Classification Search ............... 713/1
    See application file for complete search history.

(56) References Cited

U.S. PATENT DOCUMENTS

| 6,351,781 | B1 * | 2/2002 | Gracias et al. ............... 710/22 |
| 6,711,059 | B2 * | 3/2004 | Sinclair et al. ......... 365/185.11 |
| 2003/0051114 | A1 * | 3/2003 | Natu ......................... 711/165 |
| 2005/0038986 | A1 * | 2/2005 | Agan et al. .................... 713/2 |

* cited by examiner

*Primary Examiner*—Thomas Lee
*Assistant Examiner*—Mohammed H Rehman
(74) *Attorney, Agent, or Firm*—Martine Penilla & Gencarella, LLP

(57) ABSTRACT

A method for managing use of a fixed memory space of a computer system is provided. The computer system interfaces with controllers for managing operation of devices that operate with the computer system. The method includes determining whether sufficient memory is allocated in the fixed memory space for initializing code for the controllers, and jumping to swappable portion of the fixed memory space. The method also includes executing code in the swappable portion of the fixed memory space. The method further includes loading additional code needed to initialize the controllers from an external memory chip to the fixed memory space where the additional code is executed to complete initialization of the controllers of the computer system.

12 Claims, 8 Drawing Sheets

METHOD FOR MANAGING MEMORY SPACE DURING SYSTEM INITIALIZATION

CROSS REFERENCE TO RELATED APPLICATIONS

This application is a continuation of prior U.S. application Ser. No. 10/133,812 entitled "Method For Managing Memory Space During System Initialization," filed on Apr. 24, 2002 now U.S. Pat. No. 7,234,047, the disclosure of which is incorporated herein by reference.

BACKGROUND OF THE INVENTION

1. Field of the Invention

This invention relates generally to the field of computing technology and more particularly concerns the initialization routine of a computer system which prepares the system for the loading of an operating system.

2. Description of the Related Art

During a computer system's initialization routine, commonly referred to as a boot sequence, a variety of diagnostics are performed to ascertain the availability and status of hardware devices and ensure proper operation of components. For example, during initialization, a system BIOS executes a boot program which invokes a series of system checks to ascertain the location, number and identity of various devices connected to the computer system. The processing components may be a variety of host adapter cards including, by way of example only, a video display adapter, a network adapter, a SCSI adapter or other similar device. Further, these host adapters cards may either be non-processor based, such as some SCSI and RAID controllers, or may be processor based, such as some high end or low end RAID controllers. In any event, each of these processing components have an associated Option ROM BIOS chip.

FIG. 1A shows a block diagram representing an Option ROM BIOS chip for an adapter card having a BIOS image. The Option ROM BIOS chip 20 includes program instructions known as the Option ROM BIOS, and is also referred to herein as a BIOS image 22. As the need for more functionality in the initialization process continues to grow, the BIOS image 22 necessarily grows in size. A typical size of a BIOS image 22 utilized in RAID controller applications is about 64K. The contents of the BIOS image 22 includes, among other things, a header, memory allocator code, decompressor code, runtime code, initialization code, and configuration utility code. A typical processor-based RAID controller, such as the AAA-130SA ULTRA WIDE SCSI RAID Card manufactured by the Adaptec, Inc. of Milpitas, Calif. may have a compressed BIOS image size of approximately 64K.

FIG. 1B shows a block diagram illustrating the memory areas within a system RAM of a computer system. At boot-up, the system BIOS loads the BIOS image 22 to the system RAM 40. As is well known, the BIOS image 22 is loaded to an area of the system RAM that is dedicated for this use. As shown in FIG. 1B, a hexadecimal address range between C800:00 and DFFF:00 is often referred to as Option ROM memory space. For discussion purposes, it should be assumed that BIOS image-1 22a represents the copied 64K BIOS image 22. Once the BIOS image is copied to this memory space, selected portions of the BIOS image are decompressed and copied to conventional memory 42. The decompressed code is then implemented to initialize the host adapter associated with the Option ROM BIOS chip 20.

Although no problems arise during the initialization of Option ROM BIOS chip 20, there many situations in which a computer system needs to initialize several Option ROM BIOS chips. Because the size of the BIOS image continues to grow, the Option ROM memory space can be quickly consumed. This problem is pictorially illustrated in FIG. 1B, where three BIOS images 22a, 22b, and 22c need to be copied to the Option ROM memory space. After the images 22a, 22b, and 22c are in the Option ROM space, there is no other memory available for additional BIOS images or other types of initialization code such as for example, configuration code. Therefore, if additional memory space is needed, a major problem of memory deficiency would exist.

If the system BIOS encounters uncompressed BIOS images, there might also be a problem because these uncompressed BIOS images might occupy a footprint of more than 64 K. This would initially occupy even more memory when initially copied from an associated Option ROM BIOS chip into the Option ROM memory space.

In addition to problems with memory usage in the Option ROM memory space, space within conventional memory and extended memory is also typically limited. Therefore, in cases where conventional memory, extended memory, and Option ROM memory space are filled, there is often no memory space available when code such as a configuration code from an Option ROM chip is desired to be run during the initialization process. When such a circumstance occurs, the configuration code that a user desires to run may not operate because the conventional memory and extended memory are filled. In addition, the Option ROM space as indicated above, may be filled with other types of Option ROM images and typically does not have enough space to load the configuration code. Unfortunately, when this occurs, configuration of certain types of devices may not be configured properly therefore degrading performance. Therefore, multiple problems can occur during an initialization process due to the limited amount of space available in the Option ROM space.

In view of the foregoing, what is needed is a new and improved methodology for optimizing memory resources available to a computer system during execution of the system BIOS in order to have the ability to run specialized initialization codes such as, for example, configuration code. Such an approach would thereby ensure proper initialization of the computer system.

SUMMARY OF THE INVENTION

Broadly speaking, the present invention fills these needs by providing computer implemented methods for optimizing memory resources available to a computer system during peripheral device initialization process. It should be appreciated that the present invention can be implemented in numerous ways, including as a process, an apparatus, a system, a device, a method, or a computer readable medium. Several inventive embodiments of the present invention are described below.

In one embodiment, a method for managing use of a fixed memory space of a computer system is provided. The computer system interfaces with controllers for managing operation of devices that operate with the computer system. The method includes determining whether sufficient memory is allocated in the fixed memory space for initializing code for the controllers, and jumping to swappable portion of the fixed memory space. The method also includes executing code in the swappable portion of the fixed memory space. The method further includes loading additional code needed to initialize the controllers from an external memory chip to the fixed memory space where the additional code is executed to complete initialization of the controllers of the computer system.

In another embodiment, a method to optimize memory resources is provided. The method includes loading an initialization code and a runtime code into an Option ROM memory space. The method also includes running a portion of the initialization code located in a swappable space of the Option ROM space, and copying a configuration code over the portion of the initialization code that has been run in the swappable space of the Option ROM. The method also includes running the configuration code in the swappable space of the Option ROM space.

In yet another embodiment, a method to optimize memory resources after loading of an initialization code and a runtime code into an Option ROM memory space is disclosed. The method includes determining if memory resources are available to run a configuration code during an initialization process. If memory resources are not available the method a) runs a portion of the initialization code located in a swappable space of the Option ROM space, b) copies the configuration code into the swappable space over the portion of the initialization code, and c) runs the configuration code in the swappable space of the Option ROM space. The method repeats operations b) and c) if additional configuration code is to be run. The copying of the configuration code is from a flash memory device to the Option ROM memory space.

The advantages of the present invention are numerous. Specifically, by running a portion of an initialization code occupying a portion of the Option ROM BIOS memory space, that portion of the Option ROM BIOS memory space is opened up for use by a configuration code that may be copied into that area. Then the configuration code can be run without running into problems of memory space deficiency. Moreover, if additional configuration code or other types of code are required to be run, the space used for the original swapping can be used over and over again to swap code in and out thereby enabling large amounts of code to be run in a small and limited amount of memory space. Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE EXEMPLARY EMBODIMENTS

An invention is described for a method of optimizing memory resources so additional memory space is available to a computer system during initialization of a computer system. The optimization may be done by copying and running code in a swappable memory space in a portion of an Option ROM space. It will be obvious, however, to one skilled in the art, that the present invention may be practiced without some or all of these specific details. In other instances, well known process operations have not been described in detail in order not to unnecessarily obscure the present invention.

The swapping methodology of the present invention is adapted for use with a computer system during execution of the system BIOS. For purposes of this disclosure, the computer system includes at least one processing component having an associated BIOS image. In a preferable embodiment, this processing component is an adapter card having an associated Option ROM BIOS chip including a BIOS image that is either compressed or uncompressed. In still other embodiments, the processing component can be in the form of a controller chip (e.g., a RAID controller, a SCSI controller, etc.), which may be integrated into a motherboard of a computer system as opposed to on an adapter card. In such a case, the controller chip is also generally associated with a BIOS image (i.e., in the form of an Option ROM chip). In either case, the associated BIOS image may be characterized at least in part by a runtime code and an initialization code, and in some circumstances a configuration code. The computer system also includes a system RAM having an Option ROM memory space of a confined size for accommodating the runtime code and the initialization code. As described below, a portion of the Option ROM space may be utilized so that the configuration code may be run even if no space exists in the conventional memory, extended memory, and Option ROM spaces. It should be appreciated that the exemplary embodiments disclosed herein use swappable space in the Option ROM BIOS, but swapping may be utilized in any other suitable type of memory such as, for example, conventional memory, extended memory, etc.

The inability under certain circumstances for each of a computer system's various code to be loaded into the Option ROM memory space of system RAM during a boot sequence renders the computer system unable to properly manage each of its various controllers. It is therefore an embodiment of the present invention to swap out an amount of memory within this Option ROM memory space that is occupied by a portion of the initialization code during execution of a boot sequence, thereby allowing usage of a portion of the Option ROM space for configuring the controllers associated with the computer system.

Figure 1A:
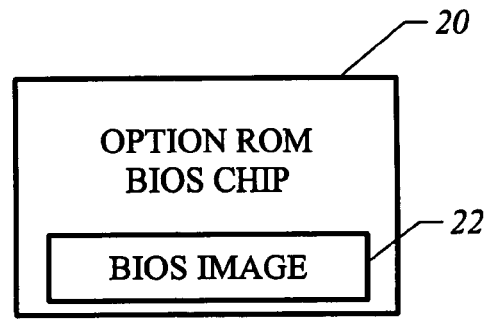
FIG. 1A shows a block diagram representing an Option ROM BIOS chip for an adapter card having a BIOS image.
Figure 1B:
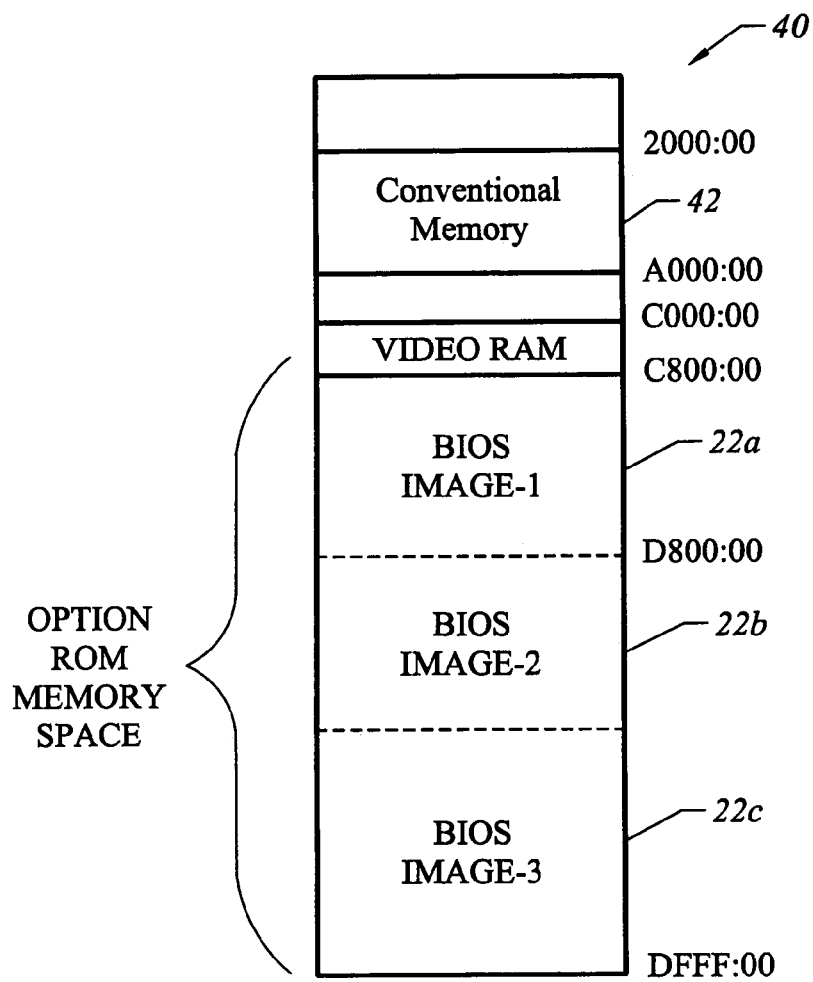
FIG. 1B shows a block diagram illustrating the memory areas within a system RAM of a computer system.
Figure 2:
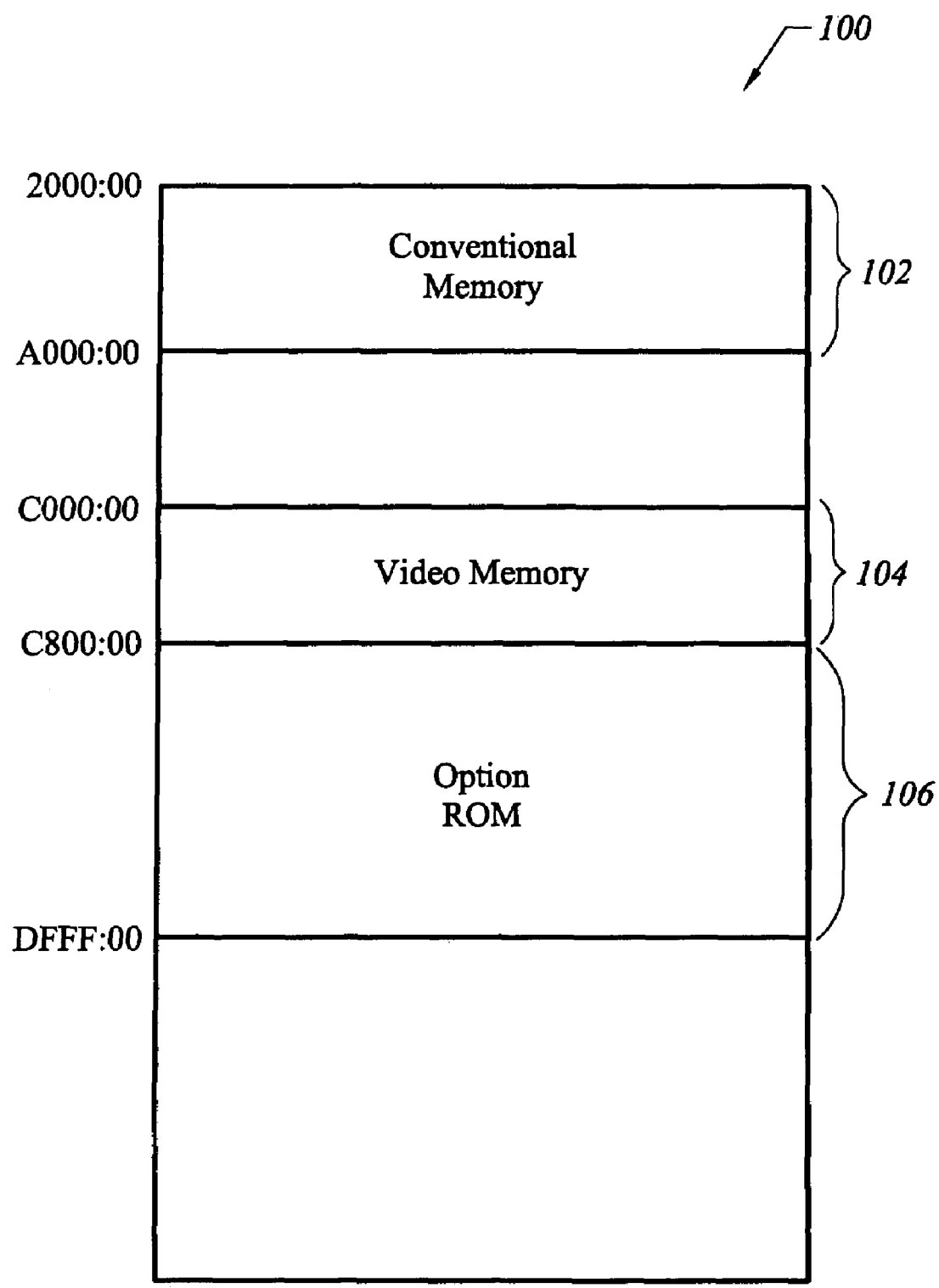
FIG. 2 illustrates a system RAM, in accordance with one embodiment of the present invention.

FIG. 2 illustrates a system RAM 100, in accordance with one embodiment of the present invention. The system RAM 100 has certain portions of memory allocated to a conventional memory space 102, a video memory space 104, and an Option ROM space 106. In one embodiment, the conventional memory space exists at a memory location between about 2000:00 and A000:00, the video memory space 104 exists at a memory location between about C000:00 and about C800:00, and the Option ROM space 106 exists at a memory location between about C800:00 and about DFFF:00. It should be appreciated that suitable memory locations may be altered depending on the application desired.

At initialization, a portion of an Option ROM image associated with an Option ROM BIOS chip is loaded into the Option ROM memory space 106 defined between C800:00 and DFFF:00. In this embodiment, a runtime code and initialization code are loaded from the Option ROM BIOS chip to the Option ROM memory space 106. In one embodiment, the initialization code may contain memory allocator code. Once loaded and run, the memory allocator code may allocate memory space in conventional memory or extended memory to load configuration code from an Option ROM BIOS chip if usage of a configuration utility is desired. In another embodiment, the memory allocator may determine if an interrupt has been initiated for running a configuration utility and therefore check to see if enough memory is available in conventional and/or extended memory to run the configuration utility. The memory allocator, in a particular embodiment, therefore attempts to utilize conventional memory first and extended memory second to load configuration code. If space is not available in the conventional or extended memory, the memory allocator may initiate swapping as described below in reference to FIG. 6 to load the configuration code into a portion of the Option ROM space and then run the configuration code. In this way, swapping enables usage of the configuration code (or other types of initialization code) to be run if the conventional memory or the extended memory is not available. It should be appreciated that swapping may be used to run any suitable type of code that may not be run properly due to lack of memory space.

In one exemplary embodiment, the runtime code and the initialization code may occupy about 32K of the Option ROM space 106. Typically, if multiple peripheral devices are utilized, the Option ROM space 106 can be filled quickly. By use of the swapping method as described herein, regardless of the size of the BIOS image, memory space such as, for example, the Option ROM space 106, even though filled, may be used as an additional memory source to run configuration code even when other memory spaces such as the conventional memory and the extended memory are not available.

In one embodiment, if the user wants to implement a configuration utility, a user can initiate an interrupt. For example, the user can initiate an interrupt by pressing the keys <control> <A>. It should be understood that any suitable key or combination of keys may be utilized to initiate the interrupt. This interrupt will cause the memory allocator to allocate additional memory in the conventional memory 102 or extended memory (not shown) for running the configuration utility. If conventional memory and/or extended memory are available then the configuration utility is executed in the available memory and the computer system is rebooted thereafter so the configuration that has been inputted may take place. If neither of those memory spaces are available, swapping of memory in the Option ROM space is utilized. The configuration utilities may include, for example, SCSI configuration, container configuration structures, container configuration, and the like. The configuration utilities can then be executed to enable the user to perform desired configurations.

Figure 3:
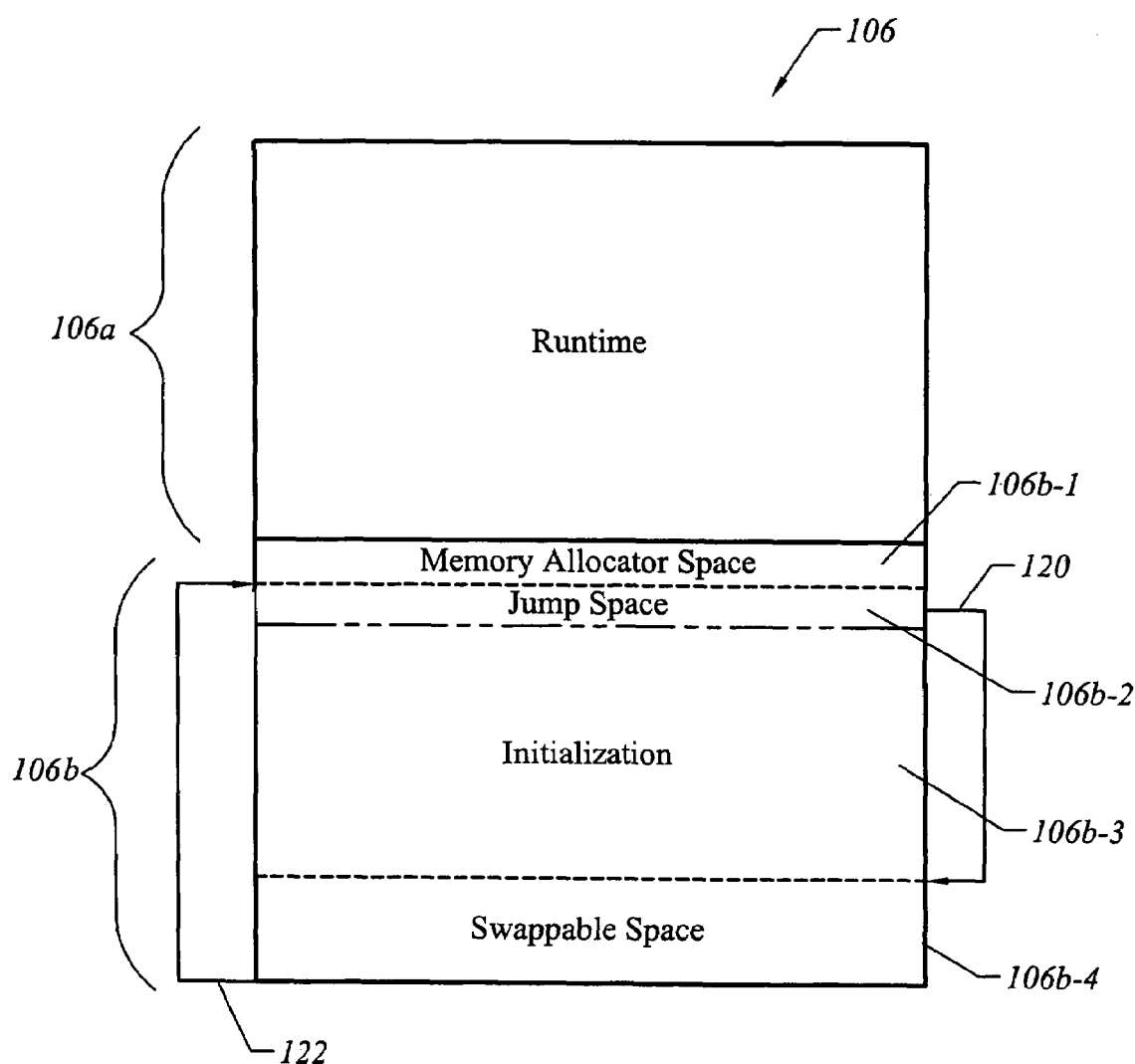
FIG. 3 shows a close-up view of the Option ROM space in accordance with one embodiment of the present invention.

FIG. 3 shows a close-up view of the Option ROM space 106 in accordance with one embodiment of the present invention. In this embodiment, the Option ROM space 106 (which also may be known as a fixed memory space) includes a runtime space 106a and an initialization space 106b. The initialization space 106b includes a memory allocator space 106b-1, a jump space 106b-2, a general initialization space 106b-3, and a swappable space 106b-4 (also known as a swappable portion of a fixed memory space). The runtime space 106a can contain runtime code as discussed in reference to FIG. 2, and the initialization space 106b is capable of containing initialization code. The jump space 106b-2 may contain jump code, and the memory allocator space 106b-1 may contain the memory allocator code. The jump code initiates a jump to the swappable space 106b-4 that contains a last portion of the initialization code located within the swappable space 106b-4. The code within the swappable space 106b-4 is a portion of the original initialization code loaded into the space 106b-4 before any swapping is done. The general initialization space 106b-3 may contain initialization code that is run after any swapping has been finished.

Figure 5:
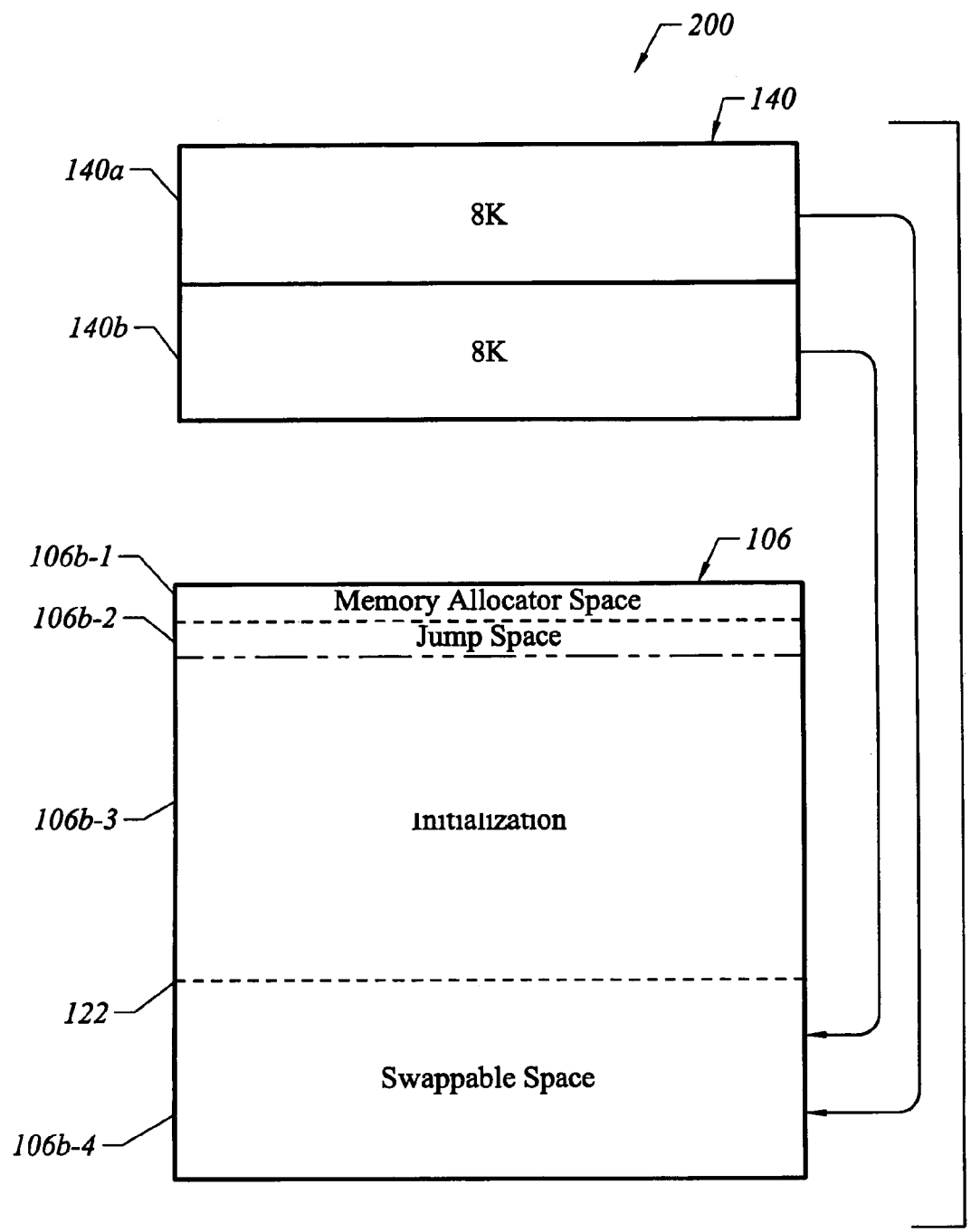
FIG. 5 illustrates a diagram showing swapping of memory space into the swappable space in accordance with one embodiment of the present invention.
Figure 6:
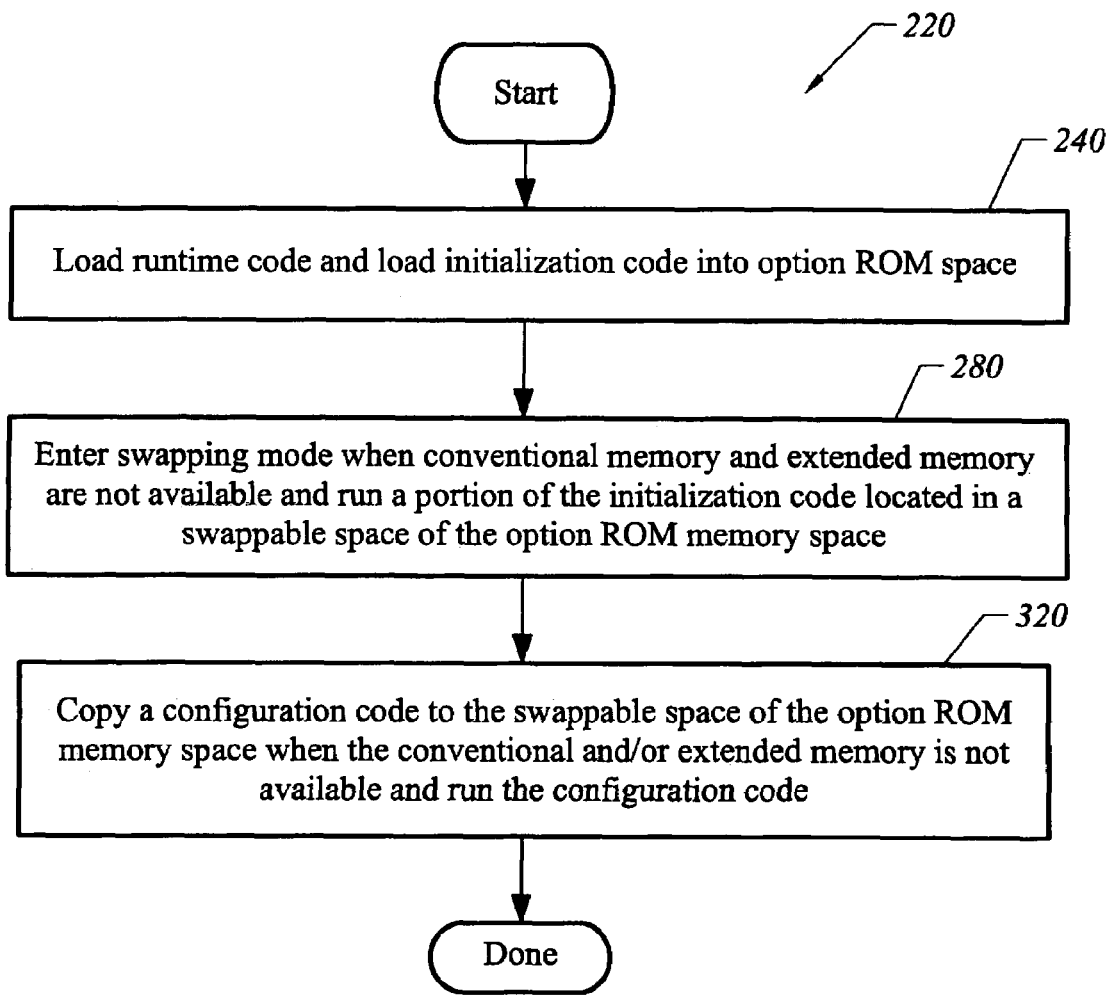
FIG. 6 shows a flowchart illustrating an optimization of memory usage for running configuration code in accordance with one embodiment of the present invention.

In one embodiment, as described in further detail in reference to FIGS. 5 and 6, swapping takes place in the swappable space 106b-4. In this embodiment, code such as, for example, configuration code, may be copied into the swappable space 106b-4 and run after the original initialization code that previously occupied the swappable space 106b-4 had been run. In one embodiment, the configuration code is configured with the ability to be swappable. The code copied over the swappable space 106b-4 can be called a swapped code. After the first swapped code is run, more code may be copied into the swappable space 106b-4 over the first swapped code and run. This can be repeated any desired number of times depending on the amount or number of code desired to be run to complete the initialization of controllers of a computer system. Therefore, any suitable number of swapping operations may be conducted even when conventional memory and extended memory is not available for use.

In one exemplary embodiment of a memory optimization process, after the runtime code and the initialization code is loaded into the runtime space 106a and initialization space 106b respectively, a jump is initiated at the beginning portion of the runtime space 106a to a beginning section of the initialization space 106b which in one embodiment is the memory allocator space 106b-1. The memory allocator is run and determines if conventional memory and/or extended memory are available. In one embodiment, the memory allocator at this time checks to see if the configuration utility if desired to be run and if so checks the conventional and/or extended memory to determine if enough memory resources are available to run the configuration utility. In another embodiment, the memory allocator may determine available memory resources and check at later point to see if a configuration utility is to be run. If other memory sources are not available, code within the jump space 106b-2 is run which initiates a jump 120 to the swappable space 106b-4 that contains a portion of the initialization code. Then the portion of the initialization code in the swappable space 106b-4 is run. Once the portion of the initialization code is run, the swappable space 106b-4 becomes usable space because the portion of the initialization code is no longer needed. After the portion of the initialization code is run, a jump 122 (or a return), to the jump space is initiated. If the memory allocator has not, at an earlier point, checked to see if a configuration utility is to be run, the memory allocator may, at this exemplary point in time, see if an interrupt has been initiated to run a configuration utility. As stated previously, in one embodiment, an interrupt to run the configuration code may be initiated by a <control> <A> keystroke. If the interrupt has been initiated, the configuration code is then copied from an appropriate device (e.g., ROM BIOS chip, flash memory, etc.) to the swappable space 106b-4. Some or all of the configuration code may then be run. If the space in the swappable space is not large enough for the entire configuration code, or other types of configuration codes are desired to be run, the swapping action may be done in a continual manner where after the configuration code in the swappable space 106b-4 has been run, more configuration code may be copied into the swappable space 106b-4. After the configuration process has been completed, the rest of the initialization code in the general initialization space 106b-3 may be run to complete the initialization procedure.

Figure 4:
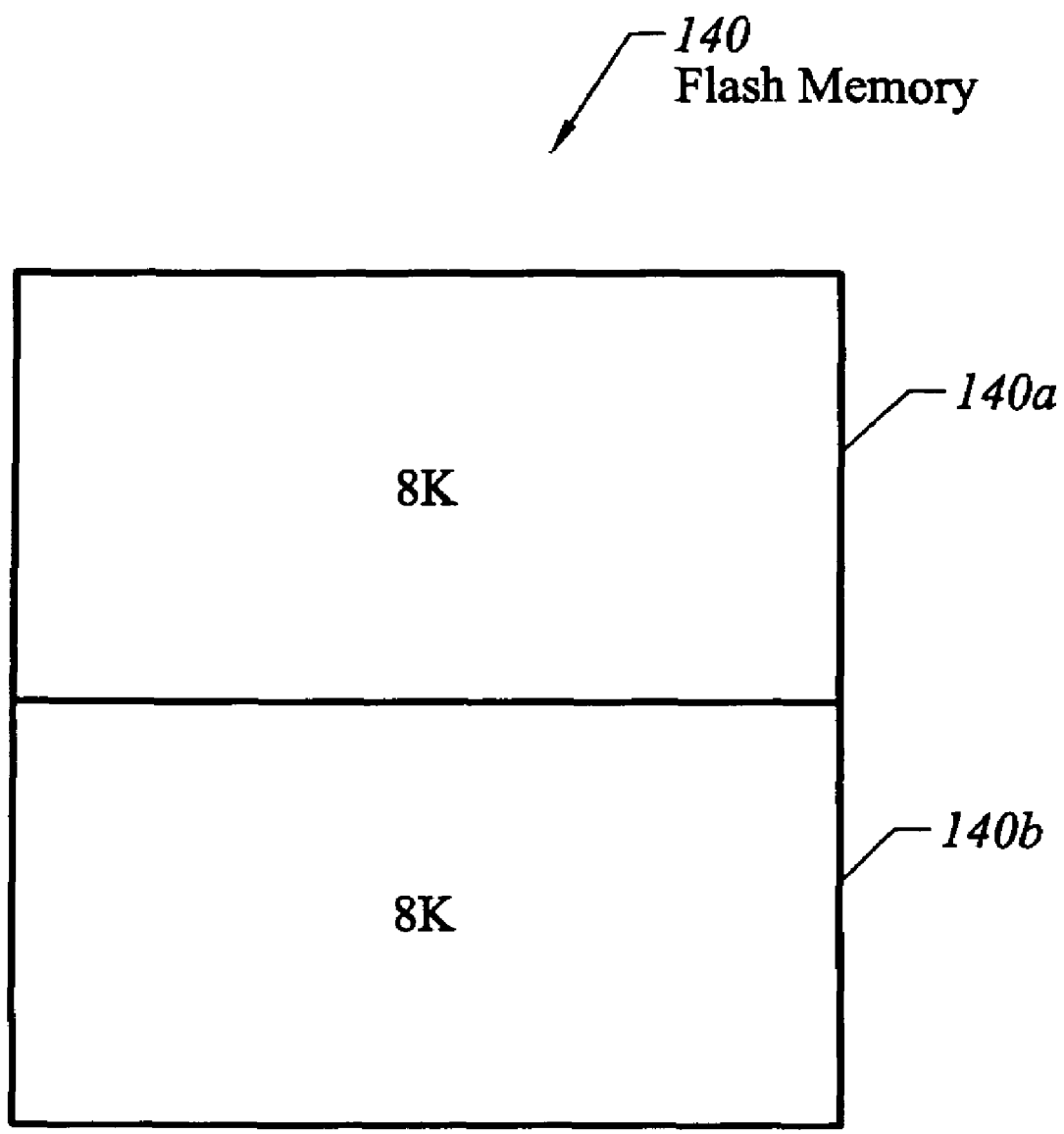
FIG. 4 shows a BIOS memory chip that includes configuration code for a peripheral device in accordance with one embodiment of the present invention.

FIG. 4 shows a BIOS memory chip 140 that includes configuration code for a peripheral device in accordance with one embodiment of the present invention. It should be appreciated that the method described herein may be utilized to run configuration code for any suitable type of device in a computer system. In this embodiment, the BIOS memory chip 140 may be a flash memory and includes 16 k of configuration code. The BIOS memory chip 140 is just one example of an external memory chip that may be utilized in this embodiment which may be in any suitable location which can communicate data to memory space 106. In one embodiment, the configuration code (which may be for a peripheral device, a controller, or some other device in a computer system) is located in the BIOS memory chip 140 that is a part of a peripheral device host card. It should be understood that the BIOS memory chip may also be embedded in a motherboard of the computer. In one embodiment, the BIOS memory chip 140 includes a first BIOS memory space 140a that has 8 k of configuration code and a second BIOS memory space 140b that has another 8 k of configuration code.

FIG. 5 illustrates a diagram 200 showing swapping of memory space into the swappable space 106b-4 in accordance with one embodiment of the present invention. In this embodiment, the BIOS chip memory chip 140 has configuration code that cannot be loaded into conventional or extended memory due to limited memory resources. Therefore, portions of the Option ROM space 106 may be utilized to run the configuration code that otherwise could not be run.

In one embodiment, memory allocator code located in the memory allocator space 106b-1 of the Option ROM is run. The memory allocator code determines if conventional memory and extended memory is available for running a configuration code if necessary and also may check to see if an interrupt has been initiated to run a configuration utility. In another embodiment, the memory allocator may check for the interrupt at a later point in the swapping process. If memory was available in conventional and/or extended memory, the swapping mode is not utilized and the conventional and/or extended memory space is utilized to run the configuration code.

If the status of the conventional and extended memory as determined by the memory allocator is such that little to no memory space is available, the swapping mode is activated where the code in the next portion of the initialization space, as shown by the jump space 106b-2, commences a jump to the swappable space 106b-4 containing a portion of the initialization code. Thereafter, the portion of the initialization code is run. After the portion of the initialization code is run, the jump 122 is initiated to a part of the jump space 106b-2 just after where the code for jump 120 is located. At this point, if a user desires, a configuration code may be run (or in an alternative embodiment, a configuration utility may be run automatically without user input). In such an embodiment, the user may input any keystroke such as, for example, <Control> <A> to initiate a configuration utility. If the user indicates that a configuration code is to be run then the configuration code located in BIOS memory space 140a is swapped into the swappable space 106b-4. In one embodiment, the configuration code swapped is about 8 k. It should be understood that the amount of code to be swapped may be varied depending on the amount of code desired to be swapped. If more code exists, then a next 8 k portion of the configuration code is swapped into the original code memory space 106b-4. In this fashion, any suitable number or amount of configuration code may be run by swapping any suitable number of times. Once the swapping desired is completed, the initialization code in the general initialization space 106b-3 is run. It should be appreciated that any other type of code besides the initialization code may be swapped into the swappable space 106b-4 to enable proper initialization of any suitable device being initialized. For example, if the Option ROM memory space is full and further Option ROM images are desired to be loaded and run, the swapping mode may be utilized to swap the code of the Option ROM images into the swappable space 106b-4. Consequently, in this way, all of the initialization code for all of the devices connected to the computer system may be properly run even with limited memory resources.

FIG. 6 shows a flowchart 220 illustrating an optimization of memory usage for running configuration code in accordance with one embodiment of the present invention. The flowchart 220 begins with operation 240 where runtime code and initialization code are loaded into Option ROM memory space. After operation 240, the method moves operation 280 where a swapping mode is entered when conventional memory and extended memory are not available, and a portion of the initialization code located in a swappable space of the Option ROM memory space is run. Operation 280 is described in further detail in reference to FIG. 7. After operation 280, the method advances to operation 320 which copies a configuration code to the swappable space of the Option ROM memory space when the conventional and/or extended memory is not available, and runs the configuration code. Operation 320 is described in further detail in reference to FIG. 8.

Figure 7:
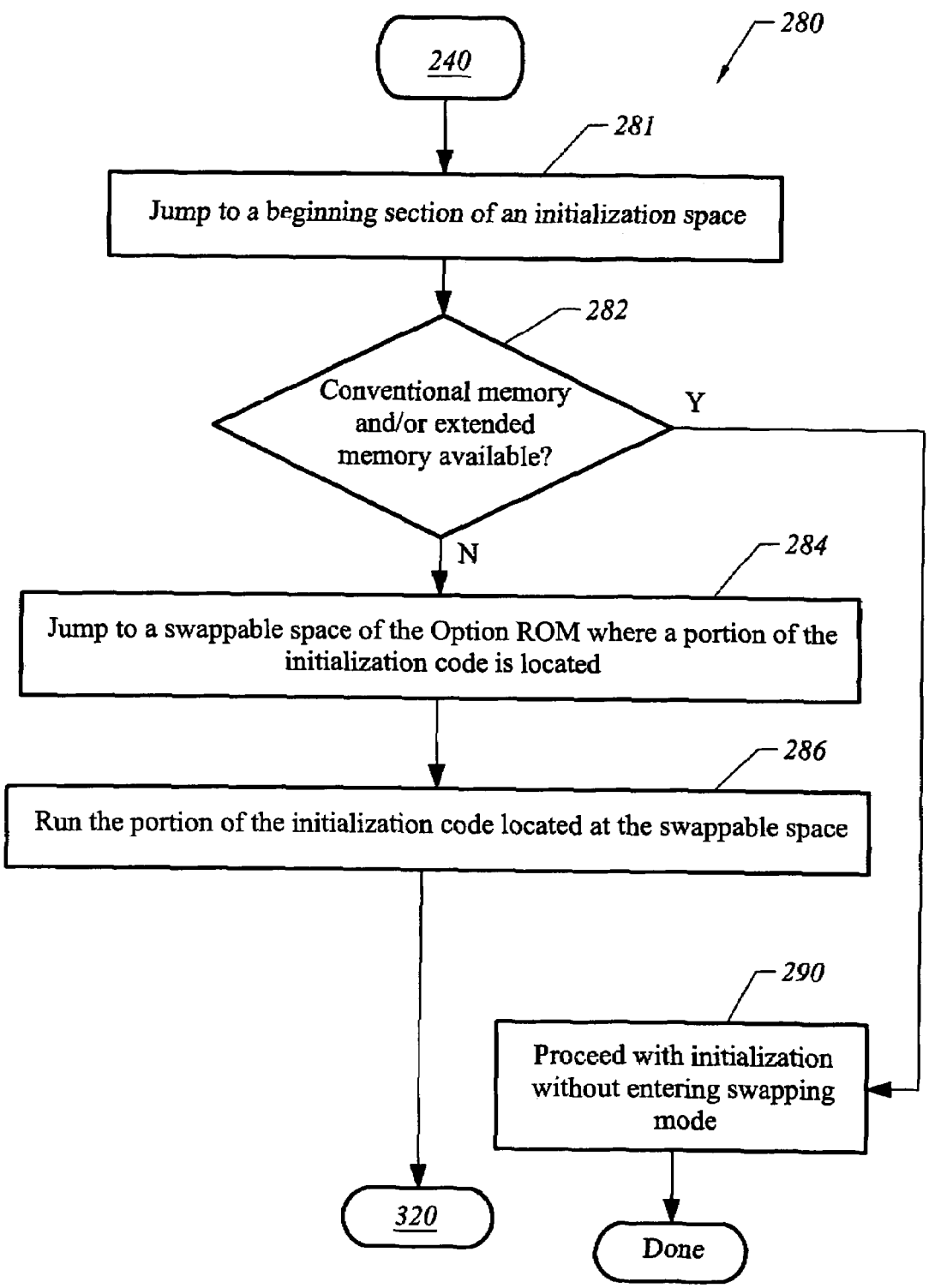
FIG. 7 illustrates a flowchart defining the entering of the swapping mode when conventional memory and extended memory are not available and the running of a portion of the initialization code located in a swappable space of the Option ROM memory space in accordance with one embodiment of the present invention.

FIG. 7 illustrates a flowchart 280 defining the entering of the swapping mode when conventional memory and extended memory are not available and the running of a portion of the initialization code located in a swappable space of the Option ROM memory space in accordance with one embodiment of the present invention. The flowchart 280 begins with operation 281 which jumps to a beginning section of an initialization space where the initialization code is located. After operation 281, the method proceeds to operation 282 which determines whether conventional memory and/or extended memory are available. In operation 282, the memory allocator may check how much memory is open in the conventional memory and the extended memory. In one embodiment, the memory allocator determines if an interrupt has been initiated to run the configuration utility and checks if enough memory resources are available to run the configuration utility (or other types of suitable code that is desired to be run). If memory is available, the method moves to operation 290 which proceeds with initialization without entering swapping mode because the conventional and/or extended memory space can be used to run configuration code or other suitable types of code without requiring used of the swapping mode.

If operation 282 determines that memory is not available, then swapping mode is utilized to optimally use the Option ROM memory space to run configuration code or other suitable types of code to accomplish proper initialization of devices connected to the computer system. Then, once it is determined that swapping mode is to be entered, the method moves to operation 284 which initiates a jump to a swappable space of the Option ROM where a portion of the initialization code is located. Then operation 286 runs the portion of the initialization code located at the swappable space of the Option ROM. After operation 286, the method continues with operation 320 as described in FIG. 6.

Figure 8:
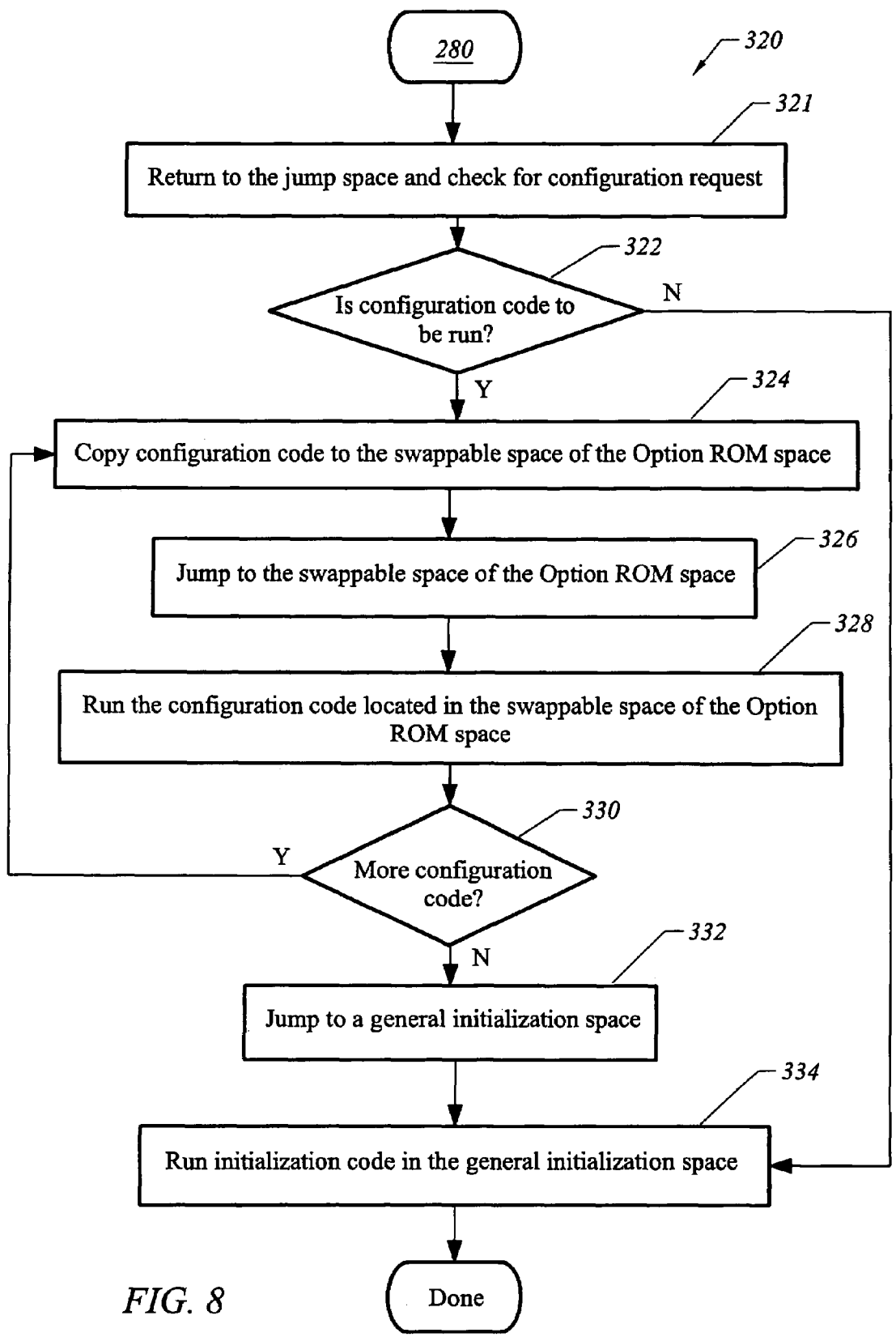
FIG. 8 illustrates a flowchart defining the copying of a configuration code to the swappable space of the Option ROM memory space when the conventional and/or extended memory is not available, and the running of the configuration code in accordance with one embodiment of the present invention.

FIG. 8 illustrates a flowchart 320 defining the copying of a configuration code to the swappable space of the Option ROM memory space when the conventional and/or extended memory is not available, and the running of the configuration code in accordance with one embodiment of the present invention. The flowchart 320 begins with operation 321 which returns to the jump space and checks for a configuration request. In one embodiment, the method checks to see if a user has inputted a keystroke such as, for example, <control> <A> to indicate a configuration request. In another embodiment, the method does not check for a configuration request if it has already been done earlier in, for example, operation 282 of FIG. 7. Then the method moves to operation 322 that determines if the configuration code is to be run. In one embodiment, if the method has found that the keystroke indicating a configuration code is to be run has not been pressed, then the method moves to operation 334 which runs the initialization code in the general initialization space.

If the method has determined that the configuration code is to be run (through initiation of the interrupt by, for example, a key stroke(s), at any suitable point in the initialization process), the method moves to operation 324 which copies the configuration code to the swappable space of the Option ROM space. Operation 324 copies the configuration code over a portion of the initialization code that has already been run.

After operation 324, the method advances to operation 326 which jumps to the swappable space of the Option ROM space. Operation 326 jumps to the swappable space so the configuration code that has been copied can be run. After operation 326, the method moves to operation 328 where the configuration code in the swappable space of the Option ROM is run. Operation 328 runs the configuration code so the swappable space once again becomes available to house additional code. Then the method moves to operation 330 which determines if more configuration code needs to be run. If more configuration code needs to be run, the method returns to operation 324 and runs operations 324, 326, 328, and 330. If there are no more configuration code, the method moves from operation 330 to operation 332 which jumps to a general initialization space. After the jump of operation 332, the method runs initialization code in the general initialization space that has not yet been run. Therefore, any suitable number of swapping operations may be conducted where code is swapped into the swappable space and run after the previous code in the swappable space has been run.

It should be understood that the embodiments of the present invention provide methods that enable intelligent initialization of controllers, host adapter cards, and the like, which have associated Option ROM BIOS images. The intelligent initialization enables optimal usage of memory resources so configuration code for any suitable device may be run using memory space not typically available for such a purpose. Therefore, even in situations where the conventional memory, extended memory, and Option ROM memory are not available, configuration code (or other suitable types of code) may be intelligently run with the limited memory resources.

The present invention may be implemented using an appropriate type of software driven computer-implemented operation. As such, various computer-implemented operations involving data stored in computer systems to drive computer peripheral devices (i.e., in the form of software drivers) may be employed. These operations are those requiring physical manipulation of physical quantities. Usually, though not necessarily, these quantities take the form of electrical or magnetic signals capable of being stored, transferred, combined, compared and otherwise manipulated. Further, the manipulations performed are often referred to in terms such as ascertaining, identifying, scanning, or comparing.

Any of the operations described herein that form part of the invention are useful machine operations. Any appropriate device or apparatus may be utilized to perform these operations. The apparatus may be specially constructed for the required purposes, or it may be a general purpose computer selectively activated or configured by a computer program stored in the computer. In particular, various general purpose machines may be used with computer programs written in accordance with the teachings herein, where it may be more convenient to construct a more specialized apparatus to perform the required operations.

Although the foregoing invention has been described in some detail for purposes of clarity of understanding, it will be apparent that certain changes and modifications may be practice within the scope of the appended claims. Accordingly, the present invention is to be considered as illustrative and not restrictive, and the invention is not to be limited to the details given herein, but may be modified within the scope and equivalence of the appended claims.

What is claimed is:

1. A method to optimize memory resources after loading of an initialization code and a runtime code into an Option ROM space, comprising:
   determining if the memory resources are available to run a configuration code during an initialization process, wherein the memory resources include extended memory, conventional memory, and the Option ROM space wherein; and
   if the extended memory, the conventional memory, and the Option ROM space are not available;
   a) running a portion of the initialization code located in a swappable space of the Option ROM space,
   b) copying the configuration code into the swappable space over the portion of the initialization code,
   c) running the configuration code in the swappable space of the Option ROM space,
   repeating operations b) and c) if additional configuration code is to be run, wherein, if the extended memory, the conventional memory, and the Option ROM space are available, the swappable space of the Option ROM space is not used for running the configuration code.

2. The method as recited in claim 1, wherein determining if the memory resources are available to run the configuration code during the initialization process includes, determining whether an interrupt has been initiated to run the configuration code.

3. The method as recited in claim 2, wherein determining the availability of the extended memory is done by a memory allocator, the memory allocator checking to see if the interrupt has been initiated.

4. The method as recited in claim 1, wherein running the portion of the initialization code includes, jumping from a jump space to the swappable space to run the portion of the initialization code.

5. The method as recited in claim 4, wherein copying the configuration code into the swappable space includes returning to the jump space after the portion of the initialization code has been run.

6. The method as recited in claim 5, wherein running the configuration code includes jumping to the swappable space to run the configuration code.

7. The method as recited in claim 1, wherein the copying of the configuration code is from a flash memory device to the Option ROM space.

8. A method for managing use of a fixed memory space of a computer system, the computer system configured to interface with controllers for managing operation of devices that operate with the computer system, comprising:

determining whether sufficient memory is allocated in a conventional memory, an extended memory, and an Option ROM for initializing the controllers;

when sufficient memory is not allocated in the conventional memory, the extended memory, and the Option ROM, executing a portion of a code needed to initialize the controllers, wherein the portion of the code is located in a swappable portion of the Option ROM; and loading an additional code needed to initialize the controllers from an external memory chip to the swappable portion of the Option ROM, wherein loading the additional code includes copying the additional code over the portion of the code previously executed in the swappable portion of the Option ROM, the additional code being executed to complete initialization of the controllers of the computer system, wherein, if the extended memory, the conventional memory, and the Option ROM are available, the swappable portion of the Option ROM is not used for running the additional code.

9. The method as recited in claim 8, wherein the additional code is configuration code.

10. The method as recited in claim 8, wherein determining whether sufficient memory is allocated is done by a memory allocator in a memory allocator space within an initialization space.

11. The method as recited in claim 8, wherein the external memory chip is a flash memory device.

12. The method as recited in claim 8, wherein executing the portion of code needed to initialize the controllers includes, jumping to the swappable portion of the Option ROM.

* * * * *